US012652095B2

(12) United States Patent
He

(10) Patent No.: US 12,652,095 B2
(45) Date of Patent: Jun. 9, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 280 days.

(21) Appl. No.: 18/317,622

(22) Filed: May 15, 2023

(65) Prior Publication Data

US 2023/0344493 A1 Oct. 26, 2023

Related U.S. Application Data

(63) Continuation of application No. PCT/CN2020/132494, filed on Nov. 27, 2020.

(51) Int. Cl.
*H04B 7/06* (2006.01)
*H04W 72/25* (2023.01)
*H04W 72/51* (2023.01)
*H04W 74/0833* (2024.01)
*H04W 74/0836* (2024.01)

(52) U.S. Cl.
CPC .......... *H04B 7/0628* (2013.01); *H04W 72/25* (2023.01); *H04W 72/51* (2023.01); *H04W 74/0833* (2013.01); *H04W 74/0836* (2024.01)

(58) Field of Classification Search
None
See application file for complete search history.

(56) References Cited

U.S. PATENT DOCUMENTS

2019/0182702 A1 6/2019 Wang et al.
2020/0351858 A1 11/2020 Tsai et al.
(Continued)

FOREIGN PATENT DOCUMENTS

CN 108810874 A 11/2018
CN 111510267 A 8/2020
(Continued)

OTHER PUBLICATIONS

Moderator ( Intel Corporation) :"Moderator summary #6 on RedCap— others" , 3GPP Draft;R1-2009780,3rd Generation Partnership Project(3GPP) , Mobile Competencecentre ;650,Route Des Lucioles ; F-06921 Sophia-Antipolis Cedex; France, vol.RAN WG1, No. e-Meeting; Oct. 26, 2020-Nov. 13, 2020, Nov. 14, 2020 (Nov. 14, 2020), XP052351690, Retrieved from the Internet : URL:https :// ftp.3gpp.org/tsg_ran/WG1_RL1/TSGR1_103-e/Docs/ R1-2009780.zip R1-2009780-RedcapothersFLS6.docx [retrieved.
(Continued)

*Primary Examiner* — Srinivasa R Reddivalam
(74) *Attorney, Agent, or Firm* — Ladas & Parry LLP

(57) ABSTRACT

A wireless communication method, a terminal device, and a network device are provided. The method includes indicating, by a terminal device, a first type of the terminal device or a first capability set of the terminal device through a first message, and indicating, by the terminal device, a second type of the terminal device or a second capability set of the terminal device through a second message. The first message comprises a channel and/or a signal, and the second message comprises a channel and/or a signal.

16 Claims, 7 Drawing Sheets

Two-step random access process

(56) References Cited

U.S. PATENT DOCUMENTS

| | | | | |
|---|---|---|---|---|
| 2021/0176781 A1* | 6/2021 | Wang | .................. | H04W 74/004 |
| 2023/0038753 A1* | 2/2023 | Tan | ................... | H04W 74/0833 |
| 2023/0116354 A1* | 4/2023 | Abedini | ........... | H04W 74/0833 |
| | | | | 370/329 |
| 2023/0337273 A1* | 10/2023 | Zhang | .................. | H04L 5/0098 |
| 2024/0292398 A1* | 8/2024 | Feng | ................. | H04W 74/0833 |

FOREIGN PATENT DOCUMENTS

| | | |
|---|---|---|
| CN | 111567126 A | 8/2020 |
| CN | 111901835 A | 11/2020 |
| EP | 4096291 A1 | 11/2022 |
| EP | 4135457 A1 | 2/2023 |

OTHER PUBLICATIONS

Panasonic:"On RedCap device identification", 3GPP Draft; R1-2008291,3rd Generation Partnership Project (3GPP), Mobile Competence Centre; 650, Route Des Lucioles ; F-06921 Sophia-Antipolis Cedex; France, vol.RAN WG1, No. e-Meeting; 2020-Oct. 26, 2020-Nov. 6, 2020,Nov. 1, 2020 (Nov. 1, 2020), XP052349649, Retrieved from the Internet : URL ; https:// ftp. 3gpp.org/tsg_ran/ WG1_RL1/TSGR1_103-e/Docs/R1-2008291.zip R1-2008291_ Redcap_others (Identification of RedCap UE)_clean . docx [retrieved on Nov. 1, 2020].

European Search Report, European Application No. 20962962.5, mailed Dec. 6, 2023 (13 pages).

First Office Action of the European application No. 20962962.5, issued on Aug. 20, 2025.

3rd Generation Partnership Project ; Technical Specification Group Radio Access Network ; NR ; Physical layer procedures for control (Release 16) , 3GPP TS 38.213 V16.1.0 (Mar. 2020) . (156 pages).

3GPP TSG RAN Meeting #89-e RP-201395, Electronic Meeting, Sep. 14-18, 2020.

International Search Report,International Application No. PCT/ CN2020/132494, mailed Aug. 2, 2021 (15 pages).

* cited by examiner

200

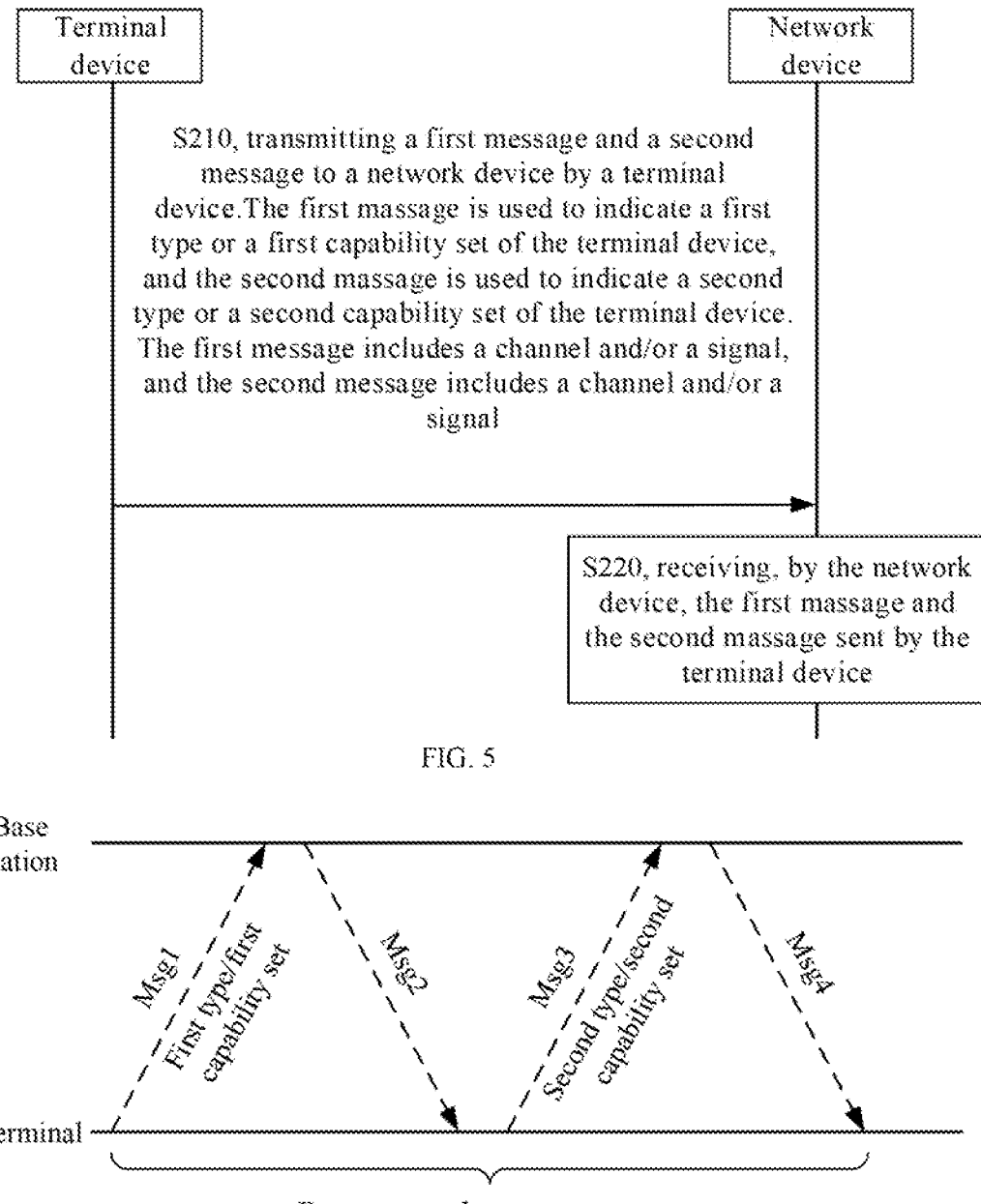

Terminal device

Network device

S210, transmitting a first message and a second message to a network device by a terminal device.The first massage is used to indicate a first type or a first capability set of the terminal device, and the second massage is used to indicate a second type or a second capability set of the terminal device. The first message includes a channel and/or a signal, and the second message includes a channel and/or a signal S220, receiving, by the network device, the first massage and the second massage sent by the terminal device

FIG. 5

Base station

Terminal

Msg1

First type/first capability set

Msg2

Msg3

Second type/second capability set

Msg4

Four-step random access process

FIG. 6

Four-step random access process

Two-step random access process

Communication system 700

Terminal device ——— 710

Network device ——— 720

WIRELESS COMMUNICATION METHOD, TERMINAL DEVICE, AND NETWORK DEVICE

CROSS REFERENCE TO RELATED APPLICATIONS

The present disclosure is a continuation of International (PCT) Patent Application No. PCT/CN2020/132494 filed on Nov. 27, 2020, the contents of which is herein incorporated by reference in its entirety.

TECHNICAL FIELD

The present disclosure relates to the field of communication, in particular to a wireless communication method, a terminal device, and a network device.

BACKGROUND

In some communication scenarios, reduced-capability (RedCap) terminal is introduced for scenarios with low performance requirements on delay, reliability, bandwidth, coverage, throughput, etc. For the RedCap terminal, how to indicate a terminal type of the RedCap terminal is an urgent problem so that a network device can optimize transmission of the RedCap terminal.

SUMMARY

In a first aspect, a wireless communication method is provided and includes: indicating, by a terminal device, a first type of the terminal device or a first capability set of the terminal device through a first message, and indicating, by the terminal device, a second type of the terminal device or a second capability set of the terminal device through a second message. The first message includes a channel and/or a signal, and the second message includes a channel and/or a signal.

In a second aspect, a terminal device is provided and includes a memory configured to store computer program and a processor configured to call and run the computer program stored in the memory to perform indicating a first type of the terminal device or a first capability set of the terminal device through a first message, and indicating a second type of the terminal device or a second capability set of the terminal device through a second message. The first message includes a channel and/or a signal, and the second message includes a channel and/or a signal.

In a third aspect, a network device is provided and includes a memory configured to store computer program and a processor configured to call and run the computer program stored in the memory to perform receiving a first message and a second message sent by a terminal device; the first message is used to indicate a first type of the terminal device or a first capability set of the terminal device, and the second message is used to indicate a second type of the terminal device or a second capability set of the terminal device; the first message includes a channel and/or a signal, and the second message includes a channel and/or a signal.

BRIEF DESCRIPTION OF THE DRAWINGS

FIG. 5 is a schematic flowchart of a wireless communication method according to some embodiments of the present disclosure.

FIG. 6 is a schematic flowchart of a terminal device indicating terminal type/capability set according to some embodiments of the present disclosure.

DETAILED DESCRIPTION

Figures 1, 2:
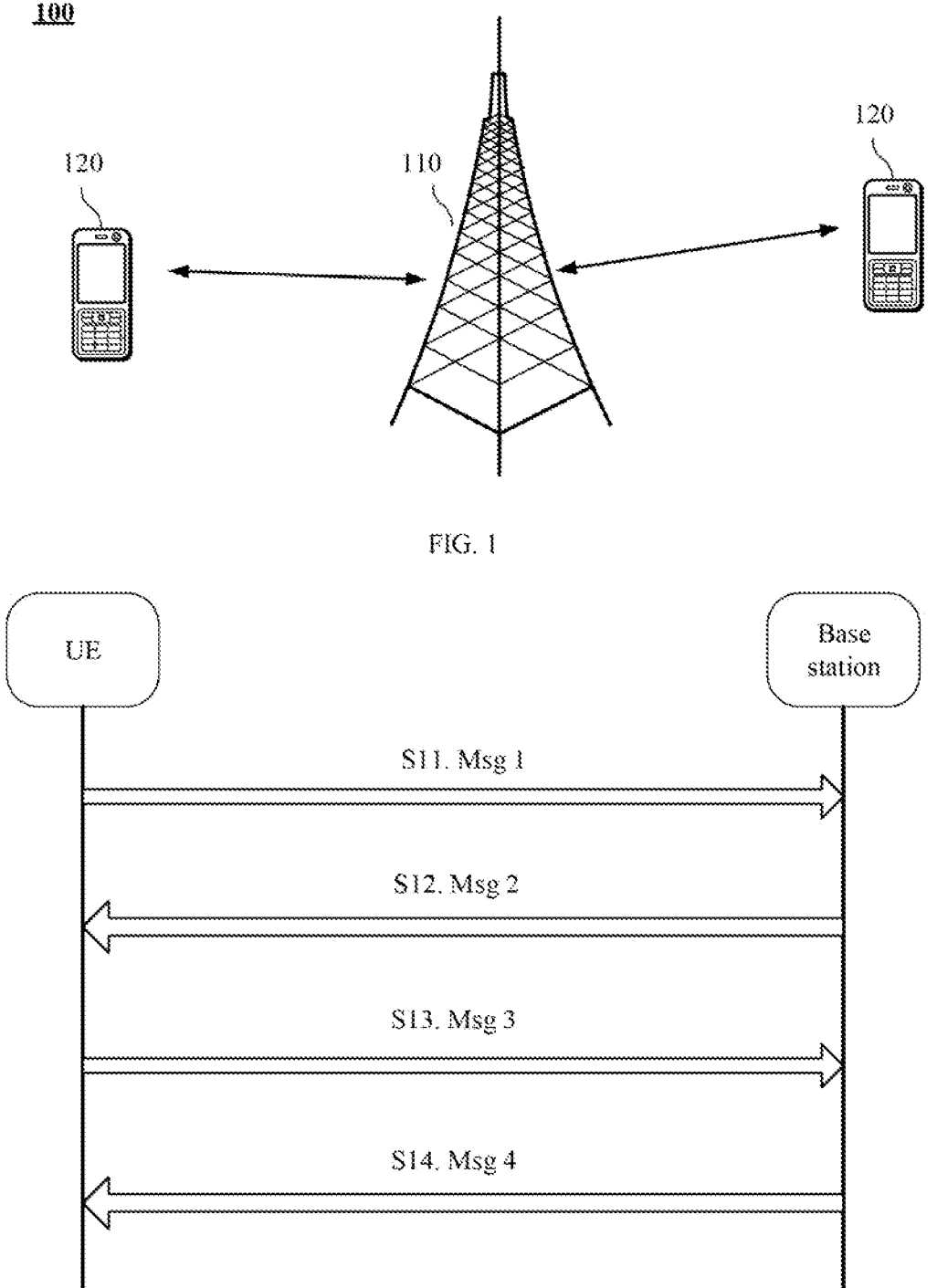
FIG. 1 is a schematic diagram of a communication system architecture according to some embodiments of the present disclosure.
FIG. 2 is a schematic flowchart of a four-step random access process according to some embodiments of the present disclosure.

The technical solution in embodiments of the present disclosure will be described below in conjunction with the drawings of the present disclosure. Obviously, described embodiments are a part of embodiments of the present disclosure, not all of the embodiments. Based on the embodiments in the present disclosure, all other embodiments obtained by those of ordinary skill in the art without creative work shall fall within the scope of the present disclosure.

The technical solution of embodiments of the present disclosure may be applied to various communication systems, such as: Global System of Mobile communication (GSM) system, Code Division Multiple Access (CDMA) system, Broadband Code Division Multiple Access (WCDMA) system, General Packet Radio Service (GPRS), Long Term Evolution (LTE) system, Advanced long term evolution (LTE-A) system, New Radio (NR) system, evolution system of NR system, LTE based access to unlicensed spectrum (LTE-U) system, NR based access to unlicensed spectrum (NR-U) system, Non Territorial Networks (NTN) system, Universal Mobile Communication System (UMTS), Wireless Local Area Networks (WLAN), Wireless Fidelity (WiFi), 5th Generation (5G) system or other communication systems.

Generally speaking, traditional communication systems support a limited number of connections and are easy to be implemented. However, with the development of communication technology, mobile communication systems will not only support traditional communication, but also support, for example, device to device (D2D) communication, machine to machine (M2M) communication, machine type communication (MTC), Vehicle to Vehicle (V2V) communication, or Vehicle to everything (V2X) communication, etc., embodiments of the present disclosure may also be applied to these communication systems.

In some embodiments, the communication system of the present disclosure may be applied to a carrier aggregation (CA) scenario, a dual connectivity (DC) scenario, or an independent standalone (SA) networking scenario.

In some embodiments, the communication system of the present disclosure may be applied to an unauthorized spectrum considered as a shared spectrum. In some embodiments, the communication system of the present disclosure may also be applied to a licensed spectrum considered as an unshared spectrum.

Embodiments of the present disclosure describe various embodiments in combination with a network device and a terminal device. The terminal device may also be called a user equipment (UE), an access terminal, a user unit, a user station, a mobile station, a mobile station, a remote station, a remote terminal, a mobile device, a user terminal, a terminal, a wireless communication device, a user agent or user apparatus, etc.

The terminal device may be a station (ST) in WLAN, a cellular phone, a cordless phone, a session initiation protocol (SIP) phone, a wireless local loop (WLL) station, a personal digital assistant (PDA) device, a handheld device with wireless communication functions, a computing device, or other processing device connected to a wireless modem, a board devices, a wearable devices, a next-generation communication system such as a terminal device in NR network, or a terminal device in the future evolution of public land mobile network (PLMN) network, etc.

In embodiments of the present disclosure, the terminal device may be deployed in land, including indoor or outdoor, such as a handheld device, a wearable device, or a vehicle device. The terminal device may also be deployed in the water (such as in ships, etc.). The terminal device may also be deployed in the air (such as in aircraft, in balloons, or in satellites, etc.).

In embodiments of the present disclosure, the terminal device may be a mobile phone, a tablet computer, a computer with wireless transceiver function, a virtual reality (VR) terminal device, an augmented reality (AR) terminal device, a wireless terminal device in industrial control, self-driving, remote medical, a smart grid, transportation safety, smart city, or smart home, etc.

As an example without limitation, in embodiments of the present disclosure, the terminal device may also be a wearable device. The wearable device may also be called a wearable smart device, which is a general name of wearable devices applying wearable technology to intelligently design daily wear, such as a glass, a glove, a watch, clothing and a shoe, etc. The wearable device is a portable device that is directly worn on the body or integrated into the user's clothes or accessories. The wearable devices are not only a hardware device, but also has powerful functions through software support, data interaction and cloud interaction. The generalized wearable smart device has full functions, large size, complete or partial functions that may be implemented without relying on smart phones, the generalized wearable smart device may be a smart watch or a smart glass, etc. The generalized wearable smart device may only focus on certain application functions, and needs to be used together with other devices such as a smart phone, various smart bracelets and smart jewelry for sign monitoring.

In embodiments of the present disclosure, the network device may be configured to communicate with mobile devices. The network device may be an access point (AP) in WLAN, a base station (BTS) in GSM or CDMA, a base station (NodeB, NB) in WCDMA, an evolutionary base station (eNB or eNodeB) in LTE, a relay station or access point, an on-board device, a wearable devices, a network device or a base stations (gNB) in NR networks, a network device in PLMN networks that will evolve in the future or a network device in NTN networks, etc.

As an example without limitation, in embodiments of the present disclosure, the network device may have a mobility characteristic, for example, the network device may be a mobile device. In some embodiments, the network device may be a satellite or balloon station. For example, the satellite may be a low earth orbit (LEO) satellite, a medium earth orbit (MEO) satellite, a geostationary earth orbit (GEO) satellite, or a high elliptical orbit (HEO) satellite, etc. In some embodiments, the network device may also be a base station set at land, water, or other locations.

In embodiments of the present disclosure, the network device may provide services for a cell, and the terminal device communicates with the network device through transmission resources (for example, frequency domain resources, or spectrum resources) used by the cell. The cell may be a cell corresponding to the network device (for example, a base station). The cell may belong to a macro base station or a base station corresponding to a small cell. The small cell here includes a Metro cell, a Micro cell, a Pico cell, and a Femto cell, etc. These small cells have characteristics of small coverage and low transmission power, and are suitable for providing high-speed data transmission services.

Exemplarily, the communication system 100 applied in embodiments of the present disclosure is shown in FIG. 1. The communication system 100 may include a network device 110. The network device 110 may be a device communicating with a terminal device 120 (or be called as a communication terminal, a terminal). The network device 110 may provide communication coverage for a specific geographical area, and may communicate with terminal devices located in the coverage area.

FIG. 1 shows one network device and two terminal devices in an exemplary manner. In some embodiments, the communication system 100 may include a plurality of network devices, and coverage of each network device may include other terminal devices, which is not limited.

In some embodiments, the communication system 100 may also include a network controller, a mobile management entity and other network entities, which is not limited.

It should be understood that, a device with communication function in the network/system in embodiments of the present disclosure may be called as a communication device. Taking the communication system 100 shown in FIG. 1 as an example, the communication device may include the network device 110 and the terminal device 120 with communication function, and the network device 110 and the terminal device 120 may be a specific device described above, which is not repeated here. The communication device may also include other devices in the communication system 100, such as a network controller, a mobile management entity and other network entities, which is not limited.

It should be understood that the terms "system" and "network" are often used interchangeably. The term "and/ or" is just an association relationship that describes association objects, indicating that there may be three kinds of relationships, for example, A and/or B may indicate that there are three cases: A alone, A and B together, and B alone. In addition, the character "i" generally indicates that front and back associated objects are an "or" relationship.

The terms used in embodiments of the present disclosure are only used to explain embodiments of the present disclosure, and are not intended to limit the present disclosure. The terms "first", "second", "third" and "fourth" in the description, claims and the drawings of the present disclosure are used to distinguish different objects, rather than to describe a specific order. In addition, the terms "include" and "have" and any deformation thereof are intended to cover non-exclusive inclusion.

It should be understood that the "indicate" mentioned in embodiments of the present disclosure may be a direct indication, an indirect indication, or an association. For example, A indicates B, which may indicate that A indicates B directly, for example, B may be obtained through A. It may also indicate that A indicates B indirectly, for example, A indicates C, and B may be obtained through C. It may also indicate that there is an association between A and B.

In the description of embodiments of the present disclosure, the term "correspond" may indicate that there is a direct or indirect correspondence between the two, or that there is an association between the two, or that there is a relationship between indicating and being indicated, configurating and being configurated.

In embodiments of the present disclosure, "predefined" may be implemented by pre saving corresponding codes, tables or other methods that may be used to indicate relevant information in a device (for example, including a terminal device and a network device), and the present disclosure does not define specific implementation of the "predefined". For example, predefined may mean that being defined in the protocol.

In embodiments of the present disclosure, "protocol" may refer to a standard protocol in the communication field. For example, it may include LTE protocol, NR protocol or relevant protocols applied in the future communication system, which is not limited.

In order to better understand embodiments of the present disclosure, a random access process related to the present disclosure is described.

A random access process in the 5G system adopts a four-step random access process similar to LTE, which is shown in FIG. 2.

At operation S11, a user equipment (UE) transmits a physical random access channel (PRACH) to a base station. The PRACH includes a random access preamble, that is, Message 1 (Msg 1).

At operation S12, after the base station detects that the UE has sent the random access preamble, the base station transmits a random access response (RAR), that is, message 2 (Msg 2), to inform that the UE may use a physical uplink shared channel (PUSCH) resource when the UE transmits a message 3 (Msg 3), allocate a temporary radio network temporary identifier (RNTI) to the UE, and provide the UE with a time advance command, etc.

At operation S13, after the UE receives the RAR, the UE transmits the Msg 3 in the PUSCH resource designated by the RAR. The Msg 3 carries a particular temporary identification information of the UE.

At operation S14, the base station transmits a message 4 (Msg 4) to the UE, which includes a contention resolution message, and allocates uplink transmission resources to the UE. In response to receiving the Msg 4 sent by the base station, the UE will detect whether the particular temporary identification information of the UE sent by the UE in the Msg 3 is included in the contention resolution message sent by the base station. If the particular temporary identification information of the UE is included in the contention resolution message, it indicates that the random access of the UE is successful. Otherwise, it is considered that the random access of the UE is failed, and the UE needs to start the random access process again from a first operation.

A delay overhead of the four-step random access process is relatively large and not suitable for a low delay and high reliability scenarios in 5G. In a standardization process of NR, considering characteristics of related services with low delay and high reliability, a two-step random access process, namely, Type-2 random access process, is introduced in release 16 (R16). Compared with the four-step random access process, the two-step random access process may reduce access delay. Correspondingly, the four-step random access process is called as Type-1 random access process.

Figure 3:
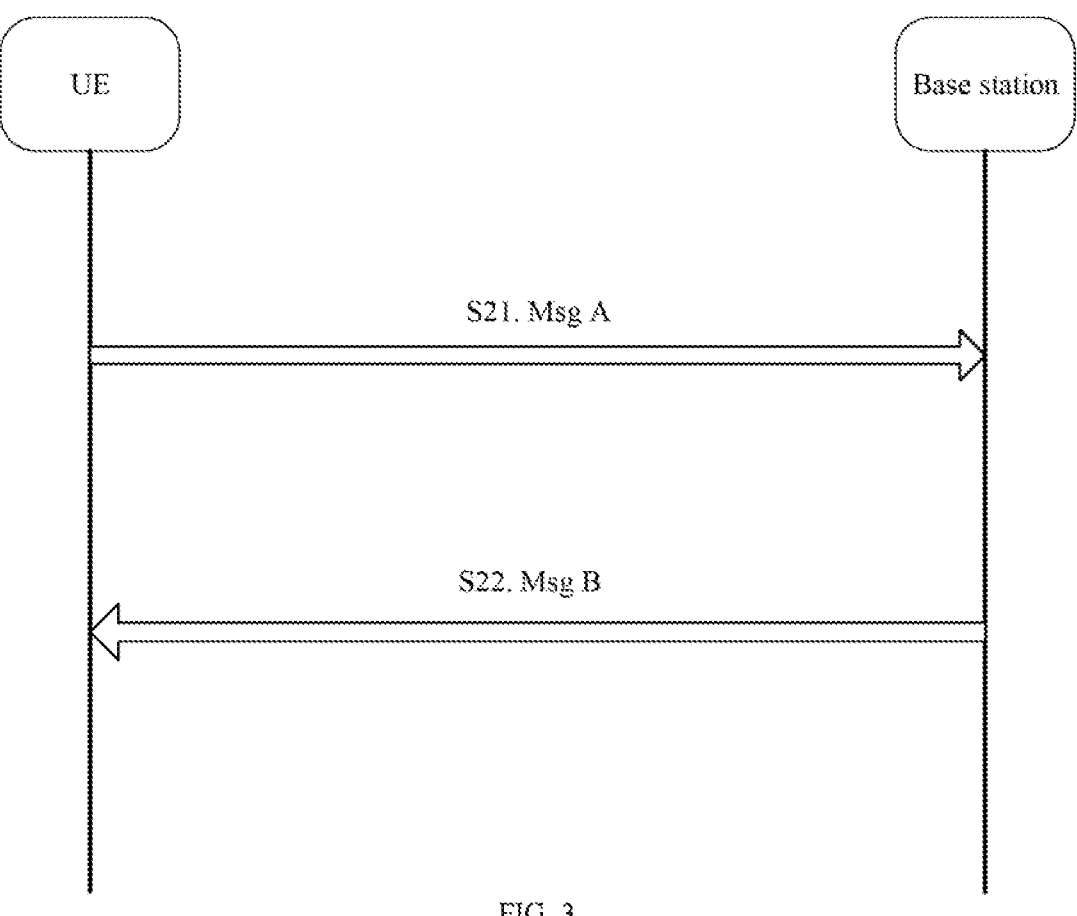
FIG. 3 is a schematic flowchart of a two-step random access process according to some embodiments of the present disclosure.
Figure 4:
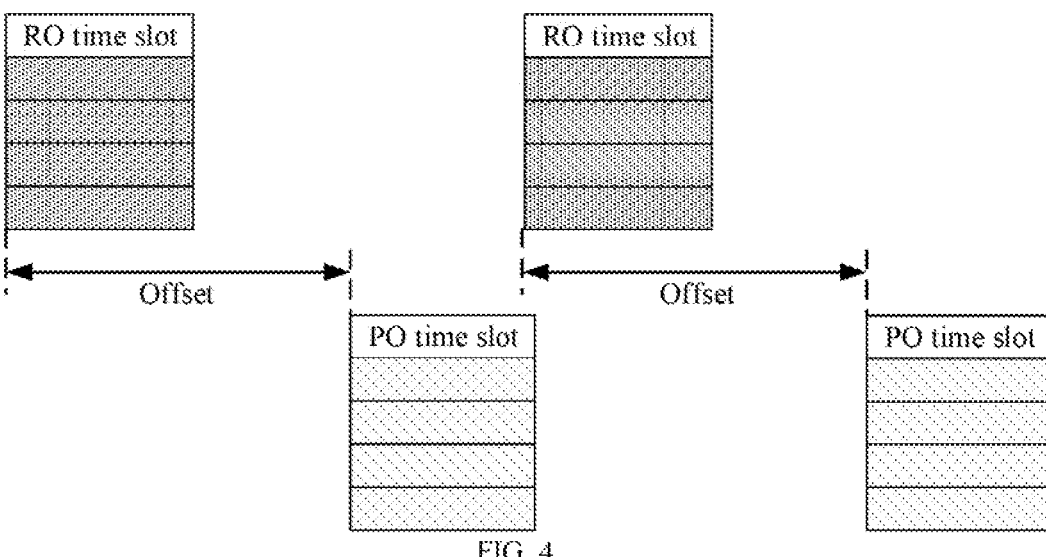
FIG. 4 is a schematic diagram of a PO timeslot and a RO timeslot according to some embodiments of the present disclosure.

The two-step random access process is shown in FIG. 3. Simply speaking, the Msg 1 and the Msg 3 in the four-step random access process is equivalent to be combined into S21 in the two-step random access process, at which the UE transmits a message A (Msg A), and the Msg 2 and the Msg 4 in the four-step random access process is equivalent to be combined into S22 in the two-step random access process, at which the base station responds to a message B (Msg B). For S21 in the two-step random access process, the Msg A includes a preamble and PUSCH, and the Msg B includes a physical downlink control channel (PDCCH) and a physical downlink shared channel (PDSCH). For the Msg A, the UE needs to transmit the preamble and the PUSCH. A random access channel occupation (RO) where the preamble is located at is the same as that in the four-step random access process. Through network configuration, the RO where the preamble is located at may be shared with a RO in the four-step random access process or configured separately. A time-frequency resource where the PUSCH is located at is called as PUSCH occasion (PO). A PO may include multiple PUSCH resource units (PRUs), a PRU includes PUSCH resources and a demodulation reference signal (DMRS), and the DMRS includes DMRS ports and DMRS sequences. The PO is also configured through the network, and a cycle of the PO is the same as that of RO, and is associated with RO. As shown in FIG. 4, a relative relationship between the PO and an associated RO in the time-frequency domain is configured by the network.

In order to better understand embodiments of the present disclosure, the RedCap terminal related to the present disclosure is described.

The NR system is mainly designed to support an enhanced Mobile Broadband (eMBB) service. Main technologies of the NR system are to meet needs of high speed, high frequency spectral efficiency, and large bandwidth. In fact, in addition to the eMBB, there are also many different types of services, such as a sensor network service, a video surveillance service, and a wearable service, etc. They have different requirements with eMBB services in terms of speed, bandwidth, power consumption, or cost, etc. A capability of a terminal supporting these services is lower than that of a terminal supporting the eMBB, such as reduction of supported bandwidth, relaxation of processing time, reduction of antenna number, or relaxation of maximum modulation order, etc. The NR system needs to be optimized for these services and corresponding reduced-capability terminal, which is referred as a RedCap terminal for short. In LTE technology, similar systems have been designed to support a terminal with multiple access, low-power, and low-cost, such as machine type communication (MTC), narrow band internet of things (NB-IoT). In the NR system, similar technologies are hoped to be introduced to better support other service types except eMBB service through NR technology. For a terminal with low complexity and low cost, one optimization that needs to be carried out is coverage enhancement to improve downlink and uplink coverage of the terminal.

In order to better understand embodiments of the present disclosure, the network identifying the RedCap terminal related to the present disclosure is described.

After receiving a system message, an initially accessed UE initiates a random access process to establish a radio resource control (RRC) connection with the network. In this process, the network needs to identify the type of UE and obtain capability information related to the UE.

At present, the following manners may be used to indicate the type of UE.

The indication may be performed in a transmission stage of the Msg 1. For example, the indication may be performed through an initial uplink bandwidth part (BWP) where the Msg 1 transmission is located at, through an independent PRACH resource, or through an independently-divided PRACH preamble set.

The indication may be performed in a transmission stage of the Msg 3. For example, the indication may be performed in a load of the PUSCH carrying the Msg 3.

The indication may be performed after a transmission stage of the Msg 4. For example, the indication may be performed through message 5 (Msg 5) or the indication is taken as a capability of the UE to report.

For the two-step random access process, the indication may be performed in a transmission stage of the Msg A.

The terminal type of the RedCap terminal may not be informed to the network device in the initial access stage. Compared with non-RedCap terminals, a receiving performance of downlink channel of the RedCap terminal is degraded since the number of receiving antennas is reduced. In the random access process, the network transmits the Msg 2 and the Msg 4 to a terminal through a public channel. Since a type of the terminal is unknown, a conservative approach is that, the network configures a transmission mode of downlink channel, such as a size of a scheduling resource and modulating coding scheme, according to the number of receiving antennas of the RedCap terminal. This approach will reduce downlink spectral efficiency. At present, a solution to this problem is that the RedCap terminal reports its own terminal type in the random access process, so that the network may use a corresponding transmission mode of downlink channel. In general, the network identifies an access of the RedCap terminal earlier, and the network thereby optimizes the transmission of the RedCap terminal earlier, which improves the transmission efficiency. For example, through indication of the Msg 1, the network may optimize the RedCap terminal when transmitting the Msg 2. However, the indication is performed in the transmitting stage of the Msg 1, which includes that difference of preamble, initial uplink BWP, and PRACH resources are used to distinguish between RedCap terminals and non-RedCap terminals. This may divide a resource set of PRACH, which leads to a reduced utilization rate of the PRACH resources, and results in reduced user capacity supported by PRACH. When it is necessary to indicate multiple types of RedCap terminals, the PRACH resource is further divided, which further exacerbate this problem.

Regarding to the above problems, the present disclosure provides a scheme for indicating a type or capability of RedCap terminal. A terminal device indicates the type or capability set of the terminal device through two messages in different stages, so that a network device may formulate different optimization schemes for transmission in different stages to improve spectral efficiency.

The technical solution of the present disclosure is detailed below through specific embodiments.

FIG. 5 is a schematic flowchart of a wireless communication method 200 according to some embodiments of the present disclosure. As shown in FIG. 5, the method 200 may include at least some of the following operations.

At operation S210, a terminal device transmits a first message and a second message to a network device.

The first message is used to indicate a first type of the terminal device or a first capability set of the terminal device, and the second message is used to indicate a second type of the terminal device or a second capability set of the terminal device. The first message includes a channel and/or a signal, and the second message includes a channel and/or a signal.

At operation S220, the network device receives the first message and the second message sent by the terminal device.

That is, in embodiments of the present disclosure, the terminal device indicates the first type or the first capability set of the terminal device through the first message, and indicates the second type or a second capability set of the terminal device through the second message.

The terminal device respectively transmits the first message and the second message in two stages. Therefore, the network device may formulate different optimization schemes for transmission in different stages to improve spectral efficiency.

In some embodiments, the first type of the terminal device is configured to indicate that the terminal device is a RedCap terminal, and the second type of the terminal device is configured to indicate a type of the terminal device in RedCap terminals. That is, the second type is configured to indicate a type of the RedCap terminal.

It should be noted that the first type is a type different from a non-RedCap terminal, and is used for the network device to identify the terminal device transmitting first message is a RedCap terminal different from a traditional terminal. That is, in a stage for transmitting the first message, although there are many RedCap terminal types, which specific type is not indicated, and thus, the terminal device transmitting the first message is only identified as a RedCap terminal.

In addition, the second type is a more specific RedCap terminal type, and may be divided according to capabilities of RedCap terminals, such as bandwidth, processing time, the number of antennas, and maximum modulation order, etc.

In some embodiments, different types of RedCap terminals correspond at least one of different bandwidths, different numbers of receiving antennas, different maximum modulation orders, and different processing capability. In some embodiments, different types of RedCap terminals may also have other different capabilities, which is not limited.

For example, type 1 of the RedCap terminal corresponds to 2 antennas for reception, and type 2 of the RedCap terminal corresponds to 1 antenna for reception.

For another example, type 1 of the RedCap terminal corresponds to 20 MHz bandwidth capability and 2 antennas for reception, type 2 of the RedCap terminal corresponds to 15 MHz bandwidth capability and 1 antenna for reception, and type 3 of the RedCap terminal corresponds to 20 MHz bandwidth capability, 1 antenna for reception, reduced maximum modulation order, and extended processing time.

In some embodiments, the second type of the terminal device is pre-configured or agreed by a protocol, or the second type of the terminal device is configured or indicated by the network device.

In some embodiments, the first capability set of the terminal device at least includes the number of the receiving antennas in the terminal device.

The second capability set of the terminal device includes at least one of the following.

Bandwidth supported by the terminal device, maximum modulation order supported by the terminal device, and processing capability information of the terminal device.

In some embodiments, the terminal device is a RedCap terminal.

It should be noted that the first capability set may also include other capability elements, and the second capability set may also include other capability elements, which is not limited.

For example, the first capability set includes the number of receiving antennas in the terminal device, and the second capability set includes bandwidth supported by the terminal device.

For another example, the first capability set includes the number of receiving antennas in the terminal device. The second capability set includes bandwidth supported by the terminal device, maximum modulation order supported by the terminal device, and processing capability information of the terminal device.

For yet another example, the first capability set includes the number of receiving antennas in the terminal device, bandwidth supported by the terminal device. The second capability set includes maximum modulation order supported by the terminal device, and processing capability information of the terminal device.

For yet another example, the first capability set includes the number of receiving antennas of the terminal device, the processing capability information of the terminal device. The second capability set includes the maximum modulation order supported by the terminal device, and the bandwidth supported by the terminal device.

For yet another example, the first capability set includes the number of receiving antennas of the terminal device, the maximum modulation order supported by the terminal device. The second capability set includes the processing capability information of the terminal device, and bandwidth supported by the terminal device.

In some embodiments, the first capability set of the terminal device is pre-configured or agreed by a protocol, or the first capability set of the terminal device is configured or indicated by the network device.

In some embodiments, the second capability set of the terminal device is pre-configured or agreed by a protocol, or the second capability set of the terminal device is configured or indicated by the network device.

In some embodiments, as example 1, the first message is carried in the Msg 1 in the four-step random access process, and the second message is carried in the Msg 3 in the four-step random access process, as shown in FIG. 6.

In some embodiments, in the example 1, the first message is determined by at least one of the following.

PRACH, PRACH occasion, PRACH format, random access preamble, initial uplink BWP for transmitting PRACH.

In some embodiments, in the example 1, the second message is determined by at least one of the following.

Scrambling information of data carried in PUSCH, sequence information of PUSCH DMRS, information carried in PUSCH, PUSCH resource configuration, and PUSCH DMRS configuration.

It should be noted that in order to optimize transmission of the RedCap terminal at a beginning of the Msg 2 transmission, resources of PRACH has to be divided in the related art to distinguish between non-RedCap terminals and multiple types of RedCap terminals, causing a reduced utilization rate of PRACH resources and a reduced user capacity supported by PRACH.

In order to reduce division of the PRACH resources and identify the RedCap terminal in the PRACH transmission stage as soon as possible, a technical solution of example 1 may indicate the first type of the RedCap terminal through the first message carried by the Msg 1, and indicate the second type of the RedCap terminal through the second message carried by the Msg 3. The first type is a type different from the non-RedCap terminal, and is used for network device to identify that the terminal device transmitting first message is a RedCap terminal different from a traditional terminal. That is, in a stage for transmitting the first message, although there are many RedCap terminal types, which specific type is not indicated, and thus, the terminal device transmitting the first message is only identified as a RedCap terminal. Therefore, the PRACH resources for determining the first message only needs to be divided a set for use by the RedCap terminal, thereby reducing a further division of the PRACH resources. The PRACH resources includes one or more of PRACH, PRACH occasion, PRACH format, random access preamble, and the initial uplink BWP for transmitting PRACH.

That is, in example 1, in a transmission stage of the PRACH of the Msg 1, the network device may identify the RedCap terminal and optimize transmission of the Msg 2 to some extent, but the network device does not know which specific type of the RedCap terminal. At this time, the network device may assume a capability set of the RedCap terminal. For example, different types of RedCap terminals have different numbers of receiving antennas, including 1 antenna or 2 antennas. Therefore, when the network device transmits the Msg 2, for PDCCH and PDSCH transmission the RedCap terminal is conservatively assumed to have 1 antenna for reception to determine a transmission mode of downlink channel, such as a size of scheduling resource, modulating coding scheme, etc., thereby improving spectral efficiency and ensuring reception performance of the RedCap terminal.

In example 1, when the RedCap terminal transmits the Msg 3, the second type of the RedCap terminal is indicated by the second message carried in the Msg 3. The second type is a more specific type of the RedCap terminal, or is called as a sub-type. A sub-type may be defined according to capabilities of RedCap terminals, such as bandwidth, processing time, number of antennas, and maximum modulation order, etc. According to difference of these capabilities, each of multiple sub-types corresponds to a capability set. For example, sub-type 1 corresponds to 20 MHz bandwidth capability and 2 antennas for reception, and sub-type 2 corresponds to 20 MHz bandwidth capability, 1 antenna for reception, maximum modulation order reduction, and extended processing time. It may be seen that a capability of the sub-type 2 is different from that of the sub-type 1. After the network device knows which sub-type, transmission of the Msg 4 and later transmission may be further optimized to improve spectral efficiency.

In addition, a purpose of the network devices identifying RedCap terminals is to optimize uplink and downlink transmission and improve spectral efficiency. In the transmission stage of the Msg 1, the first capability set of the RedCap terminal may be indicated by the first message carried in the Msg 1. The first capability set may include important capability information, such as the number of receiving antennas. The network device may optimize transmission according to the number of receiving antennas in the transmission stage of the Msg 2. In the transmission stage of the Msg 3, the second capability set of the RedCap terminal may be further indicated by the second message carried in the Msg 3. The second capability set may include further capability information, including supported bandwidth and processing time capability. These may further be used to optimize downlink transmission when the network device transmits the Msg 4. For example, bandwidth and processing time capability may be used to determine a size of frequency resources scheduled by PDSCH and the number of time slots between the PDCCH and the PDSCH.

Therefore, in the technical solution of example 1, the type or capability set of the terminal device (such as the RedCap terminal) is indicated in two stages respectively, which may avoid reduced utilization of PRACH resources caused by excessive division of PRACH resources. In addition, the network device may identify the RedCap terminal in the Msg 1 stage, so as to optimize transmission of the Msg2/3/4 and improve spectral efficiency.

Figure 7:
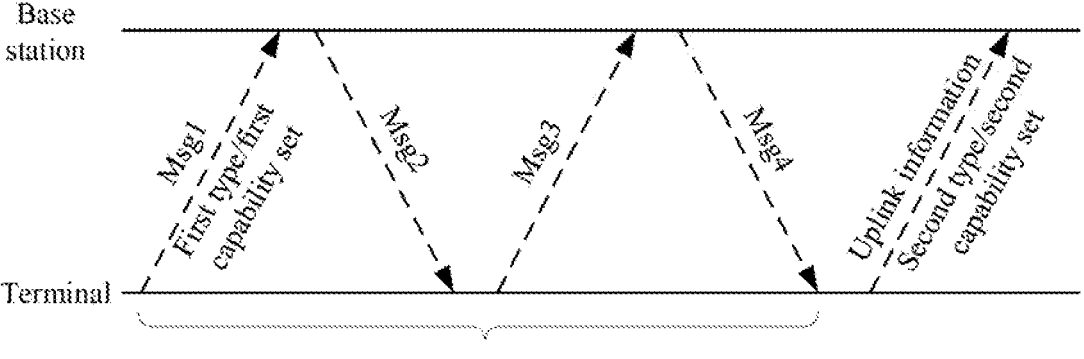
FIG. 7 is a schematic flowchart of a terminal device indicating terminal type/capability set according to some embodiments of the present disclosure.

In some embodiments, as an example 2, the first message is carried in the Msg 1 in the four-step random access process, and the second message is carried in an uplink message after the four-step random access process, as shown in FIG. 7.

In some embodiments, in the example 2, the first message is determined by at least one of the following.

PRACH, PRACH occasion, PRACH format, random access preamble, and initial uplink BWP for transmitting PRACH.

In some embodiments, in the example 2, the second message is determined by at least one of the following.

Information carried in PUSCH and information carried in a physical random access channel (PUCCH).

Alternatively, the second message includes at least one of information carried in PUSCH and information carried in PUCCH.

That is to say, in the example 2, for the identification of the RedCap terminal in the random access process stage, the network device only needs to identify whether it is a RedCap terminal, or identify a corresponding capability set. In the random access stage, optimization is performed according to this identification information. After the random access stage, the RedCap terminal may report the second type or the second capability set. For example, the type or the capability of the RedCap terminal may be reported through a high-level signaling, so that the network device may optimize subsequent transmissions based on the second type or the second capability set.

Figure 8:
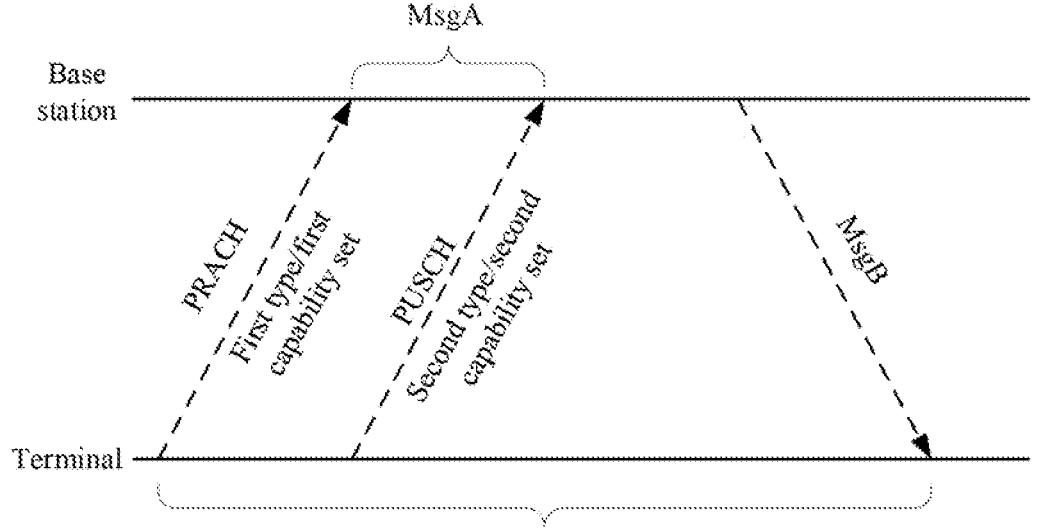
FIG. 8 is a schematic flowchart of a terminal device indicating terminal type/capability set according to some embodiments of the present disclosure.

In some embodiments, as example 3, the first message is carried in the PRACH of the Msg A in the two-step random access process, and the second message is carried in the PUSCH of the Msg A in the two-step random access process, as shown in FIG. 8.

In some embodiments, in the example 3, the first message is determined by at least one of the following.

PRACH, PRACH occasion. PRACH format, random access preamble, and initial uplink BWP for transmitting PRACH.

In some embodiments, in the example 3, the second message is determined by at least one of the following.

Scrambling information of data carried in PUSCH, sequence information of PUSCH DMRS, information carried in PUSCH. PUSCH resource configuration, and PUSCH DMRS configuration.

It should be noted that, for the two-step random access process, the first message carried in the PRACH of the Msg A may indicate the first type or the first capability set of the RedCap terminal, and the second message carried in the PUSCH of the Msg A may indicate the second type or the second capability set of the RedCap terminal. The advantage of this solution is that when the network device receives the PRACH of the Msg A but does not receive the PUSCH of the Msg A, a fallback RAR may be sent in the Msg B. At this time, although the network device does not receive the PUSCH of the Msg A, the first type or the first capability set of the RedCap terminal may be determined through the PRACH of the Msg A, so as to optimize transmission of the Msg B.

Figure 9:
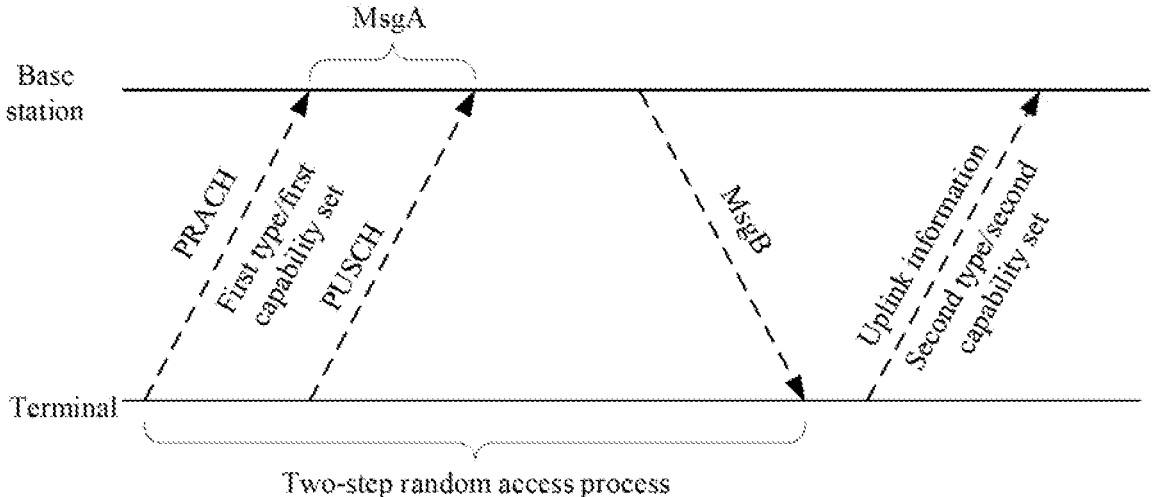
FIG. 9 is a schematic flowchart of a terminal device indicating terminal type/capability set according to some embodiments of the present disclosure.

In some embodiments, as example 4, the first message is carried in the PRACH of the Msg A in the two-step random access process, and the second message is carried in an uplink message after the two-step random access process, as shown in FIG. 9.

In some embodiments, in the example 4, the first message is determined by at least one of the following.

PRACH, PRACH occasion, PRACH format, random access preamble, and initial uplink BWP for transmitting PRACH.

In some embodiments, in the example 4, the second message is determined by at least one of the following.

Information carried in PUSCH and information carried in PUCCH.

Alternatively, the second message includes at least one of information carried in PUSCH and information carried in PUCCH.

That is, the terminal device may transmit the second message in a mode for reporting capability.

Figure 10:
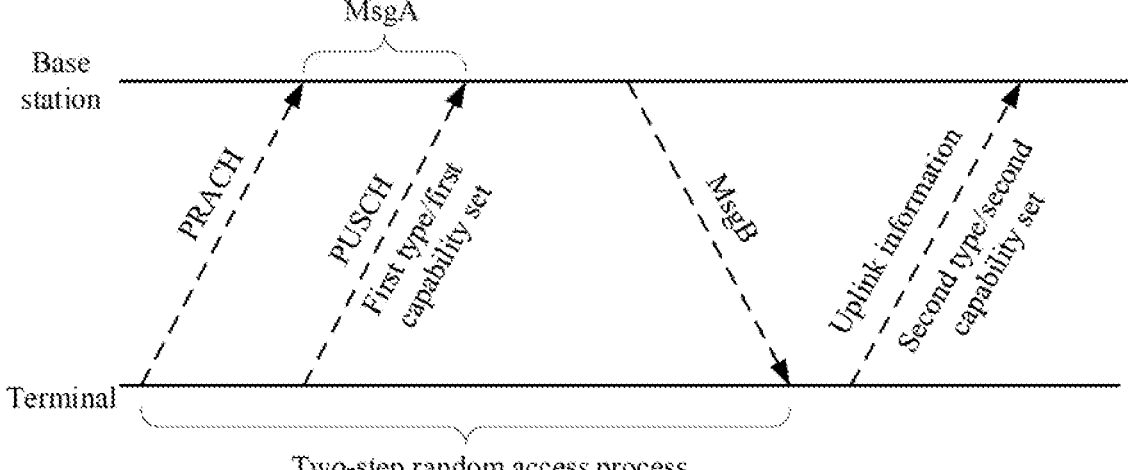
FIG. 10 is a schematic flowchart of a terminal device indicating terminal type/capability set according to some embodiments of the present disclosure.

In some embodiments, as example 5, the first message is carried in the PUSCH of the Msg A in the two-step random access process, and the second message is carried in an uplink message after the two-step random access process, as shown in FIG. 10.

In some embodiments, in the example 5, the first message is determined by at least one of the following.

Scrambling information of data carried in PUSCH, sequence information of PUSCH DMRS, information carried in PUSCH, PUSCH resource configuration, and PUSCH DMRS configuration.

The PUSCH DMRS configuration may include resources or ports of the DMRS.

In some embodiments, in the example 5, the second message is determined by at least one of the following.

Information carried in PUSCH and information carried in PUCCH.

Alternatively, the second message includes at least one of information carried in PUSCH and information carried in PUCCH.

That is, the terminal device may transmit the second message in a capability reporting mode.

It should be noted that, the two-step random access process may also be called as Type-2 random access process, and the four-step random access process may also be called as Type-1 random access process.

Therefore, in embodiments of the present disclosure, the terminal device indicates the first type or the first capability set of the terminal device through the first message, and indicates the second type or the second capability set of the terminal device through the second message. That is, the terminal device indicates the type or the capability set of terminal device through two messages in different stages, so that the network device may formulate different optimization schemes for transmission in different stages to improve spectral efficiency.

The method embodiments of the present disclosure are described in detail above with reference to FIGS. 5 to 10. Device embodiments of the present disclosure are described in detail below with reference to FIGS. 11 to 15. It should be understood that device embodiments and method embodiments correspond to each other, and similar descriptions may refer to the method embodiments.

Figure 11:
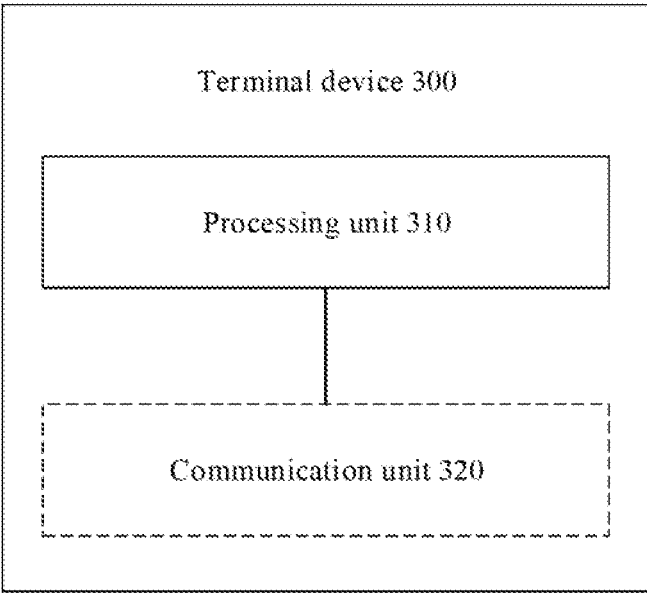
FIG. 11 is a schematic block diagram of a terminal device according to some embodiments of the present disclosure.

FIG. 11 shows a schematic block diagram of a terminal device 300 according to some embodiments of the present disclosure. As shown in FIG. 11, the terminal device 300 may include the following.

A processing unit 310 is configured to indicate a first type or a first capability set of the terminal device through the first message and indicate a second type or a second capability set of the terminal device through the second message.

The first message includes a channel and/or a signal, and the second message includes a channel and/or a signal.

In some embodiments, the first type of the terminal device is configured to indicate that the terminal device is a RedCap terminal.

The second type of the terminal device is configured to indicate a type of the terminal device in RedCap terminals. That is, the second type of the terminal device is configured to indicate a type of the RedCap terminal.

In some embodiments, different types of RedCap terminals correspond at least one of different bandwidths, different numbers of receiving antennas, different maximum modulation orders, and different processing capability.

In some embodiments, the second type of the terminal device is pre-configured or agreed by a protocol, or the second type of the terminal device is configured or indicated by a network device.

In some embodiments, the first capability set of the terminal device at least includes the number of receiving antennas in the terminal device.

The second capability set of the terminal device includes at least one of the following.

Bandwidth supported by the terminal device, the maximum modulation order supported by the terminal device, and the processing capability information of the terminal device.

In some embodiments, the first capability set of the terminal device is pre-configured or agreed by a protocol, or the first capability set of the terminal device is configured or indicated by a network device.

In some embodiments, the second capability set of the terminal device is pre-configured or agreed by a protocol, or the second capability set of the terminal device is configured or indicated by the network device.

In some embodiments, the terminal device is a RedCap terminal.

In some embodiments, the first message is carried in the Msg 1 in the four-step random access process, and the second message is carried in the Msg 3 in the four-step random access process.

In some embodiments, the first message is carried in the Msg 1 in the four-step random access process, and the second message is carried in an uplink message after the four-step random access process.

In some embodiments, the first message is carried in physical random access process channel (PRACH) of the Msg A in the two-step random access process, and the second message is carried in physical uplink shared channel (PUSCH) of the Msg A in the two-step random access process.

In some embodiments, the first message is carried in the PRACH of the Msg A in the two-step random access process, and the second message is carried in the uplink message after the two-step random access process.

In some embodiments, the first message is determined by at least one of the following.

PRACH, PRACH occasion, PRACH format, random access preamble, and initial uplink BWP for transmitting PRACH.

In some embodiments, the second message is determined by at least one of the following.

Scrambling information of data carried in PUSCH, sequence information of PUSCH DMRS, information carried in PUSCH, PUSCH resource configuration, and PUSCH DMRS configuration.

In some embodiments, the first message is carried in the PUSCH of the Msg A in the two-step random access process, and the second message is carried in the uplink message after the two-step random access process.

In some embodiments, the first message is determined by at least one of the following.

Scrambling information of data carried in PUSCH, sequence information of PUSCH DMRS, information carried in PUSCH, PUSCH resource configuration, and PUSCH DMRS configuration.

In some embodiments, the second message is determined by at least one of the following.

Information carried in PUSCH and information carried in the physical uplink control channel (PUCCH).

In some embodiments, the terminal device 300 may also include the following.

A communication unit 320 is configured to transmit the first message and the second message, respectively.

In some embodiments, the above communication unit 320 may be a communication interface or a transceiver, or an input/output interface of a communication chip or a system on chip. The processing unit may be one or more processors.

It should be understood that the terminal device 300 according to embodiments of the present disclosure may correspond to the terminal device in the method embodiments of the present disclosure, and the above and other operations and/or functions of each unit in the terminal device 300 are respectively configured to implement corresponding processes of the terminal device in the method 200 as shown in FIG. 5. For brevity, the corresponding processes is not repeated here.

Figure 12:
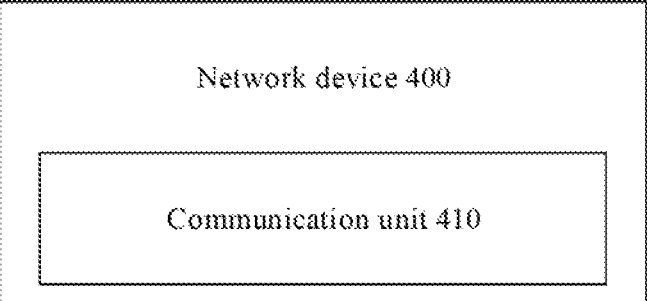
FIG. 12 is a schematic block diagram of a network device according to some embodiments of the present disclosure.

FIG. 12 shows a schematic block diagram of a network device 400 according to some embodiments of the present disclosure. As shown in FIG. 12, the network device 400 may include the following.

The network device 400 may include a communication unit 410 configured to receive the first message and the second message sent by the terminal device.

The first message is used to indicate the first type or a first capability set of the terminal device, and the second message is used to indicate the second type or a second capability set of the terminal device. The first message includes a channel and/or a signal, and the second message includes a channel and/or a signal.

In some embodiments, the first type of the terminal device is configured to indicate that the terminal device is a RedCap terminal.

The second type of the terminal device is used to indicate a type of the RedCap terminal.

In some embodiments, different types of RedCap terminals correspond at least one of different bandwidths, different numbers of receiving antennas, different maximum modulation orders, and different processing capability.

In some embodiments, the second type of the terminal device is pre-configured or agreed by a protocol, or the second type of the terminal device is configured or indicated by the network device.

In some embodiments, the first capability set of the terminal device at least includes the number of receiving antennas of the terminal device.

The second capability set of the terminal device includes at least one of the following.

Bandwidth supported by the terminal device, the maximum modulation order supported by the terminal device, and the processing capability information of the terminal device.

In some embodiments, the first capability set of the terminal device is pre-configured or agreed by a protocol, or the first capability set of the terminal device is configured or indicated by the network device.

In some embodiments, the second capability set of the terminal device is pre-configured or agreed by a protocol, or the second capability set of the terminal device is configured or indicated by the network device.

In some embodiments, the terminal device is a RedCap terminal.

In some embodiments, the first message is carried in the Msg 1 in the four-step random access process, and the second message is carried in the Msg 3 in the four-step random access process.

Alternatively, the first message is carried in the Msg 1 in the four-step random access process, and the second message is carried in an uplink message after the four-step random access process.

In some embodiments, the first message is carried in PRACH of the Msg A in the two-step random access process, and the second message is carried in physical uplink shared channel (PUSCH) of the Msg A in the two-step random access process.

In some embodiments, the first message is carried in PRACH of the Msg A in the two-step random access process, and the second message is carried in an uplink message after the two-step random access process.

In some embodiments, the first message is determined by at least one of the following.

PRACH, PRACH occasion, PRACH format, random access preamble, and initial uplink BWP for transmitting PRACH.

In some embodiments, the second message is determined by at least one of the following.

Scrambling information of data carried in PUSCH, sequence information of PUSCH DMRS, information carried in PUSCH, PUSCH resource configuration, and PUSCH DMRS configuration.

In some embodiments, the first message is carried in PUSCH of the Msg A in the two-step random access process, and the second message is carried in an uplink message after the two-step random access process.

In some embodiments, the first message is determined by at least one of the following.

Scrambling information of data carried in PUSCH, sequence information of PUSCH DMRS, information carried in PUSCH, PUSCH resource configuration, and PUSCH DMRS configuration.

In some embodiments, the second message is determined by at least one of the following.

Information carried in PUSCH and the information carried in the PUCCH.

In some embodiments, the above communication unit may be a communication interface or a transceiver, or an input/output interface of a communication chip or a system on chip.

It should be understood that the network device 400 according to embodiments of the present disclosure may correspond to the network device in the method embodiments of the present disclosure, and the above and other operations and/or functions of each unit in the network device 400 are configured to respectively implement corresponding processes w of the network device in the method 200 shown in FIG. 5. For brevity, the corresponding processes are not repeated here.

Figure 13:
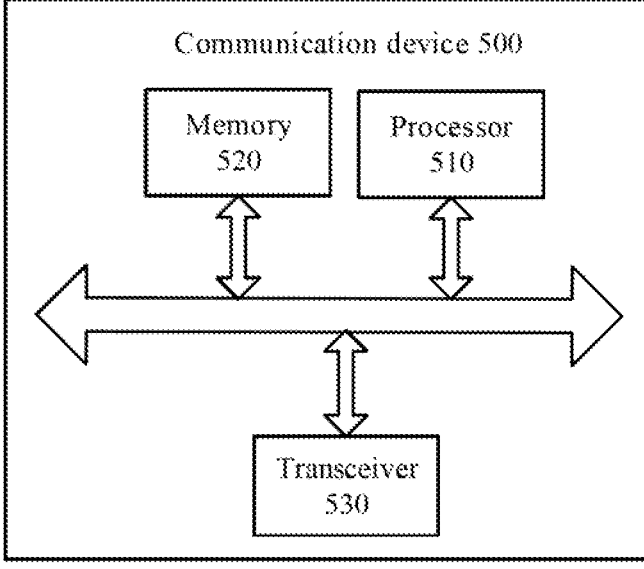
FIG. 13 is a schematic block diagram of a communication device according to some embodiments of the present disclosure.

FIG. 13 is a schematic structure diagram of a communication device 500 according to some embodiments of the present disclosure. The communication device 5R) in FIG. 13 includes a processor 510, which may call and run a computer program from a memory to implement the method in embodiments of the present disclosure.

In some embodiments, as shown in FIG. 13, the communication device 500 may also include a memory 520. The processor 510 may call and run a computer program from the memory 520 to perform the method in embodiments of the present disclosure.

The memory 520 may be a separate component independent of the processor 510, or may be integrated in the processor 510.

In some embodiments, as shown in FIG. 13, the communication device 500 may also include a transceiver 530, and the processor 510 may control the transceiver 530 to communicate with other devices. In some embodiments, the transceiver 530 may transmit information or data to other devices, or receive information or data sent by other devices.

The transceiver 530 may include a transmitter and a receiver. The transceiver 530 may further include antennas, and the number of the antennas may be one or more.

In some embodiments, the communication device 500 may be the network device of embodiments of the present disclosure, and the communication device 500 may implement corresponding processes implemented by the network device in the various methods of embodiments of the present disclosure. For brevity, the corresponding processes are not repeated here.

In some embodiments, the communication device 500 may be the terminal device of the embodiment of the present disclosure, and the communication device 500 may implement the corresponding processes implemented by the terminal device in the various methods of the embodiment of the present disclosure. For brevity, the corresponding processes are not repeated here.

Figures 14, 15:
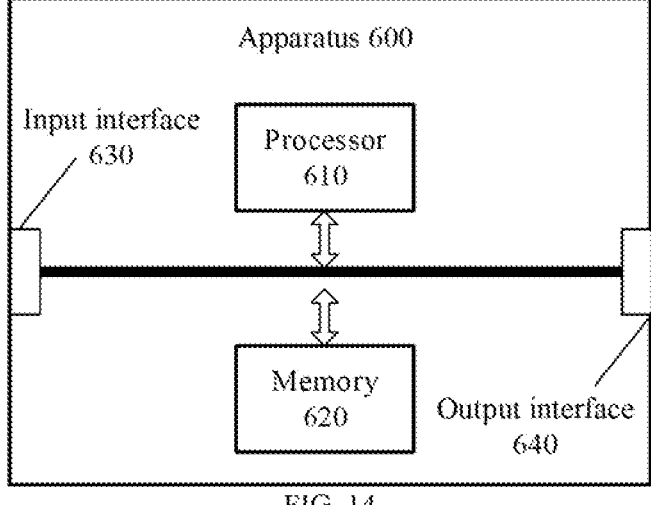
FIG. 14 is a schematic block diagram of an apparatus according to some embodiments of the present disclosure.
FIG. 15 is a schematic block diagram of a communication system according to some embodiments of the present disclosure.

FIG. 14 is a schematic structure diagram of an apparatus according to some embodiments of the present disclosure. The apparatus 600 in FIG. 14 includes a processor 610, which may call and run a computer program from a memory to implement the method in embodiments of the present disclosure.

In some embodiments, as shown in FIG. 14, the apparatus 600 may also include a memory 620. The processor 610 may call and run a computer program from the memory 620 to implement the method in embodiments of the present disclosure.

The memory 620 may be a separate component independent of the processor 610, or may be integrated in the processor 610.

In some embodiments, the apparatus 600 may also include an input interface 630. The processor 610 may control the input interface 630 to communicate with other devices or chips, and specifically, the input interface 630 may obtain information or data sent by other devices or chips.

In some embodiments, the apparatus 600 may also include an output interface 640. The processor 610 may control the output interface 640 to communicate with other devices or chips, and specifically, the output interface 640 may output information or data to other devices or chips.

In some embodiments, the apparatus 600 may be applied to the network device in embodiments of the present disclosure, and the apparatus 600 may implement the corresponding processes implemented by the network device in various method of embodiments of the present disclosure. For brevity, the corresponding processes are not repeated here.

In some embodiments, the apparatus 6M) may be applied to the terminal device in embodiments of the present disclosure, and the apparatus 600 may implement the corresponding processes implemented by the terminal device in the various methods of embodiments of the present disclosure. For brevity, the corresponding processes are not repeated here.

In some embodiments, the device mentioned in embodiments of the present disclosure may also be a chip. For example, the chip may be a system on chip, a system chip, a chip system, or a system-on-chip chip.

FIG. 15 is a schematic block diagram of a communication system 700 according to some embodiments of the present disclosure. As shown in FIG. 15, the communication system 700 includes a terminal device 710 and a network device 720.

The terminal device 710 may be configured to implement the corresponding functions implemented by the terminal device in the above method, and the network device 720 may be configured to implement the corresponding functions implemented by the network device in the above method. For brevity, the corresponding functions are not repeated here.

It should be understood that the processor in embodiments of the present disclosure may be an integrated circuit chip with signal processing capability. In implementation process, operations of foregoing method embodiments may be completed by hardware integrated logic circuits or instructions in form of software in the processor. The processor may be a general-purpose processor, a Digital Signal Processor (DSP), an Application Specific Integrated Circuit (ASIC), a Field Programmable Gate Array (FPGA) or other programmable logic devices, discrete gates or transistors Logic devices, discrete hardware components. The processor may implement and executed the methods, steps, and logical block diagrams disclosed in embodiments of the present disclosure. The general-purpose processor may be a microprocessor or any conventional processor, and so on.

The operations of the method disclosed in embodiments of the present disclosure may be directly executed and completed by a hardware decoding processor, or executed and completed by a combination of hardware and software modules in the decoding processor. The software module may be located in a mature storage medium in the art such as a random access memory, a flash memory, a read-only memory, a programmable read-only memory, an electrically erasable programmable memory, or a register, or the like. The storage medium is located in the memory, and the processor may be configured to read the information in the memory and complete the operations of the method in combination with the hardware.

It should be understood that the memory in embodiments of the present disclosure may be a volatile memory or a non-volatile memory, or may include both volatile and non-volatile memory. The non-volatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM), which is configured as an external cache. By way of exemplary but not restrictive description, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DRRAM). It should be noted that the memories of systems and methods described herein are intended to include, but are not limited to, these and any other suitable types of memories.

It should be understood that the above-mentioned memories are exemplary but not restrictive. For example, the memory in embodiments of the present disclosure may also be the SRAM, the DRAM, the SDRAM, the DDRSDRAM, the ESDRAM, the SLDRAM and the DRRAM, and so on. That is, the memory in embodiments of the present disclosure is intended to include, but is not limited to, these and any other suitable types of memory.

Embodiments of the present disclosure also provide a non-transitory computer-readable storage medium for storing a computer program.

In some embodiments, the non-transitory computer-readable storage medium may be applied to the network device in some embodiments of the present disclosure. The computer program enables the computer to perform the corresponding processes implemented by the network device in various methods of embodiments of the present disclosure. For brevity, the corresponding processes are not repeated here.

In some embodiments, the non-transitory computer-readable storage medium may be applied to the terminal device in some embodiments of the present disclosure. The computer program enables the computer to perform the corresponding processes implemented by the network device in various methods of embodiments of the present disclosure. For brevity, the corresponding processes are not repeated here.

Embodiments of the present disclosure also provide a computer program product including computer program instructions.

In some embodiments, the computer program product may be applied to the network device in embodiments of the present disclosure, and the computer program instructions enable the computer to perform the corresponding processes implemented by the network device in various method of embodiments of the present disclosure. For brevity, the corresponding processes are not repeated here.

In some embodiments, the computer program product may be applied to the terminal device in this embodiment of the present disclosure, and the computer program instructions enable the computer to execute corresponding processes implemented by the network device in various methods of embodiments of the present disclosure. For brevity, the corresponding processes are not repeated here.

Embodiments of the present disclosure also provide a computer program.

In some embodiments, the computer program may be applied to the network device in embodiments of the present disclosure. When the computer program is run on a computer, the computer may perform the corresponding processes implemented by the network device in various methods of embodiments of the present disclosure. For brevity, the corresponding processes are not repeated here.

In some embodiments, the computer program may be applied to the terminal device in the embodiment of the present disclosure. When the computer program is run on a computer, the computer may perform the corresponding processes implemented by the network device in various methods of embodiments of the present disclosure. For brevity, the corresponding processes are not repeated here.

A person of ordinary skill in the art may be aware that units and algorithm operations of examples described in combination with embodiments disclosed herein may be implemented by electronic hardware or a combination of computer software and the electronic hardware. Whether these functions are executed by hardware or software depends on the specific application and design constraint conditions of the technical solution. Professionals may use different methods for each specific application to implement the described functions, but such implementation should not be considered as going beyond the scope of the present disclosure.

Those skilled in the art may clearly understand that, for the convenience and conciseness of description, specific working processes of the above-described system, device, and unit may refer to corresponding processes in foregoing method embodiments, which is not repeated here.

In the embodiments provided by the present disclosure, it should be understood that the system, device, and method may be implemented in other ways. For example, the device described above are only illustrative. For example, a division of the units is only a logical function division, and there may be other divisions in actual implementation. For example, multiple units or components may be combined or integrated into another system, or some features can be ignored or not implemented. In addition, the displayed or discussed mutual coupling, direct coupling, or communication connection may be indirect coupling or communication connection through some interfaces, devices or units, and may be in electrical, mechanical, or other forms.

Units described as separate components may or may not be physically separated from each other, and components displayed as units may or may not be physical units. That is, they may be located in one place, or they may be distributed on multiple network units. Some or all of the units may be selected according to actual needs to achieve the objectives of the technical solutions of the embodiments.

In addition, the functional units in various embodiments of the present disclosure may be integrated into one processing unit, or each unit may exist alone physically, or two or more units may be integrated into one unit.

When the function is implemented in form of a software functional unit and sold or used as an independent product, the software functional unit may be stored in a computer readable storage medium. Based on this understanding, the technical solution of the present disclosure essentially or a part that contributes to the related art, or a part of the technical solution may be embodied in the form of a software product. The computer software product is stored in a storage medium, the storage medium includes several instructions which are configured to enable a computer device (a personal computer, a server, or a network device, and so on) to execute all or part of operations of the methods described in the various embodiments of the present disclosure. The aforementioned storage media include a U disk, a mobile hard disk, a ROM, a RAM, a magnetic disk, an optical disk, or other media that may store program codes.

Above description are only specific embodiments of the present disclosure, but does not limit the protection scope of the present disclosure. Any person skilled in the art can easily think of changes or substitutions within the technical scope disclosed by the present disclosure, and these should be covered within the protection scope of the present disclosure. Therefore, the protection scope of the present disclosure should be subject to the protection scope of claims.

What is claimed is:

1. A wireless communication method, comprising:
indicating, by a terminal device, a first type of the terminal device or a first capability set of the terminal device through a first message, and
indicating, by the terminal device, a second type of the terminal device or a second capability set of the terminal device through a second message;
wherein indicating, by the terminal device, the first type of the terminal device or the first capability set of the terminal device through the first message comprises:
indicating, by the terminal device, the first capability set of the terminal device through a message A (MsgA) in a two-step random access process;
wherein indicating, by the terminal device, the second type of the terminal device or the second capability set of the terminal device through the second message comprises:
indicating, by the terminal device, the second capability set of the terminal device through an uplink message after the two-step random access process; and
wherein the second message is determined by at least one of the following:
scrambling information of data carried in PUSCH, sequence information of PUSCH demodulation reference signal (DMRS), information carried in PUSCH, PUSCH resource configuration, or PUSCH DMRS configuration.

2. The method as claimed in claim 1, wherein
the first capability set of the terminal device at least comprises a number of receiving antennas in the terminal device; and
the second capability set of the terminal device comprises at least one of bandwidth supported by the terminal device, maximum modulation order supported by the terminal device, or processing capability information of the terminal device.

3. The method as claimed in claim 1, wherein
the first capability set of the terminal device is pre-configured or agreed by a protocol; or
the first capability set of the terminal device is configured or indicated by a network device.

4. The method as claimed in claim 1, wherein
the second capability set of the terminal device is pre-configured or agreed by a protocol; or
the second capability set of the terminal device is con-figured or indicated by a network device.

5. The method as claimed in claim 2, wherein the terminal device is a RedCap terminal.

6. The method as claimed in claim 1, wherein the first message is determined by at least one of a physical random access process channel (PRACH) of the MsgA in the two-step random access process, PRACH occasion, PRACH format, random access preamble, or initial uplink bandwidth part (BWP) for transmitting PRACH.

7. The method as claimed in claim 1, wherein the first message is determined by at least one of scrambling infor-mation of data carried in a physical uplink shared channel (PUSCH) of the MsgA in the two-step random access process, sequence information of PUSCH demodulation reference signal (DMRS), information carried in PUSCH, PUSCH resource configuration, or PUSCH DMRS configu-ration.

8. The method as claimed in claim 7, wherein the second message is determined by at least one of information carried in PUSCH or information carried in a physical uplink control channel (PUCCH).

9. The method as claimed in claim 1, further comprising:
transmitting, by the terminal device, the first message and the second message respectively.

10. A terminal device, comprising:
a memory, configured to store a computer program;
a processor, configured to call and run the computer program stored in the memory to perform:
indicating a first type of the terminal device or a first capability set of the terminal device through a first message, and indicating a second type of the terminal device or a second capability set of the terminal device through a second message;
wherein the processor is further configured to:
indicate the first capability set of the terminal device through a message A (MsgA) in a two-step random access process; and
indicate the second capability set of the terminal device through an uplink message after the two-step random access process:
wherein the second message is determined by at least one of the following:
scrambling information of data carried in PUSCH, sequence information of PUSCH demodulation refer-ence signal (DMRS), information carried in PUSCH, PUSCH resource configuration, or PUSCH DMRS configuration.

11. The terminal device as claimed in claim 10, wherein the first capability set of the terminal device at least com-prises a number of receiving antennas in the terminal device; and the second capability set of the terminal device comprises at least one of bandwidth supported by the terminal device, maximum modulation order supported by the terminal device, or processing capability information of the terminal device.

12. The terminal device as claimed in claim 10, wherein
the first capability set of the terminal device is pre-configured or agreed by a protocol; or
the first capability set of the terminal device is configured or indicated by a network device.

13. A network device, comprising:
a memory, configured to store a computer program;
a processor, configured to call and run the computer program stored in the memory to perform:
receiving a first message and a second message sent by a terminal device;
wherein the first message is used to indicate a first type of the terminal device or a first capability set of the terminal device, and the second message is used to indicate a second type of the terminal device or a second capability set of the terminal device;
wherein the first capability set of the terminal device is indicated through a message A (MsgA) in a two-step random access process, and the second capability set of the terminal device is indicated through an uplink message after the two-step random access process; and
wherein the second message is determined by at least one of the following:
scrambling information of data carried in PUSCH sequence information of PUSCH demodulation refer-ence signal (DMRS) information carried in PUSCH, PUSCH resource configuration, or PUSCH DMRS configuration.

14. The network device as claimed in claim 13, wherein
the first capability set of the terminal device at least comprises a number of receiving antennas in the ter-minal device; and
the second capability set of the terminal device comprises at least one of bandwidth supported by the terminal device, maximum modulation order supported by the terminal device, or processing capability information of the terminal device.

15. The network device as claimed in claim 13, wherein
the first capability set of the terminal device is pre-configured or agreed by a protocol; or
the first capability set of the terminal device is configured or indicated by a network device.

16. The network device as claimed in claim 13, wherein
the second capability set of the terminal device is pre-configured or agreed by a protocol; or
the second capability set of the terminal device is con-figured or indicated by a network device.

* * * * *